United States Patent
Luten et al.

(10) Patent No.: US 11,269,231 B2
(45) Date of Patent: Mar. 8, 2022

(54) PULSE-WIDTH MODULATION FOR CLEARING ELECTRO-OPTIC DEVICE

(71) Applicant: Gentex Corporation, Zeeland, MI (US)

(72) Inventors: Henry A. Luten, Holland, MI (US); Carl N. Wassink, Holland, MI (US); Kevin L. Ash, Grand Rapids, MI (US); Zachary J. Petroelje, Hudsonville, MI (US); Michael T. Stephenson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 230 days.

(21) Appl. No.: 16/552,494

(22) Filed: Aug. 27, 2019

(65) Prior Publication Data

US 2020/0073192 A1 Mar. 5, 2020

Related U.S. Application Data

(60) Provisional application No. 62/725,496, filed on Aug. 31, 2018.

(51) Int. Cl.
*G02F 1/163* (2006.01)
*G02F 1/161* (2006.01)

(52) U.S. Cl.
CPC .............. *G02F 1/163* (2013.01); *G02F 1/161* (2013.01)

(58) Field of Classification Search
CPC .............. H04N 21/47; H04N 21/4316; H04N 21/42204; H04N 21/2187;
(Continued)

(56) References Cited

U.S. PATENT DOCUMENTS 6,404,532 B1 6/2002 Berneth et al.
6,631,022 B1 * 10/2003 Kihira ..................... G02F 1/155
359/265
(Continued)

FOREIGN PATENT DOCUMENTS

WO 2008090478 A2 7/2008

OTHER PUBLICATIONS

International Search Report dated Dec. 5, 2019, for corresponding PCT application No. PCT/US2019/048315, 2 pages.
(Continued)

*Primary Examiner* — Tuyen Tra
(74) *Attorney, Agent, or Firm* — Price Heneveld LLP; Brian James Brewer

(57) ABSTRACT

A controller system configured to clear an electro-optic device may include an electro-optic device having a first substrate having a first surface and a second surface, the second surface having a first layer of electrically conductive material disposed thereon; a second substrate having a first surface having a second layer of electrically conductive material disposed thereon, and a second surface, the second substrate being approximately parallel to the first substrate such that a chamber is defined by the first and second substrates; and an electro-optic medium disposed in the chamber defined by the first and second substrates and in contact with the first and second layers of electrically conductive material; a controller in communication with the electro-optic device, wherein the controller is configured to control electrical power supplied to the electro-optic device and a potentiometer in communication with the electro-optic device and with the controller.

18 Claims, 4 Drawing Sheets

(58) Field of Classification Search
CPC ......... H04N 21/21805; H04N 21/4223; H04N 21/44218; H04N 5/2257; H04N 5/2253; H04N 5/247; H04L 65/4092; H04L 65/4076; G06F 3/04842; G06F 3/013; G06K 9/00597
See application file for complete search history.

(56) References Cited

U.S. PATENT DOCUMENTS

| | | | |
|---|---|---|---|
| 8,188,835 | B2 | 5/2012 | Inschlag et al. |
| 2007/0097484 | A1* | 5/2007 | Libretto .................. G02F 1/163 |
| | | | 359/275 |
| 2013/0258440 | A1 | 10/2013 | Eaton et al. |
| 2013/0271811 | A1* | 10/2013 | Lam ......................... E06B 9/24 |
| | | | 359/266 |
| 2013/0271813 | A1 | 10/2013 | Brown |

OTHER PUBLICATIONS

Written Opinion of the International Searching Authority dated Dec. 5, 2019, for corresponding PCT application No. PCT/US2019/048315, 4 pages.
Extended European Search Report dated Sep. 22, 2021, for corresponding European application No. 19855652.4, 8 pages.
International Preliminary Report on Patentability dated Mar. 2, 2021, for corresponding PCT application No. PCT/US2019/048315, 5 pages.

* cited by examiner

PULSE-WIDTH MODULATION FOR CLEARING ELECTRO-OPTIC DEVICE

CROSS REFERENCE TO RELATED APPLICATIONS

This application claims the benefit of and priority to U.S. Provisional Patent Application No. 62/725,496, filed on Aug. 31, 2018, entitled Pulse-Width Modulation for Clearing Electro-Optic Device, the entire disclosure of which is hereby incorporated herein by reference.

FIELD OF THE INVENTION

The present disclosure generally relates to a controller and method for an electro-optic device, and more particularly, to a controller and method for rapidly clearing an electro-optic device without reverse coloring.

BACKGROUND

An electrochromic (EC) device may be darkened by the application of a sufficient electrical potential across the cell electrodes. In a freely diffusing electrochromic cell, the anode and cathode are reversible depending on the polarity of the potential applied. The anodic EC species are oxidized at the anode (positive bias) of the cell. The cathodic species are reduced at the cathode (negative bias) of the cell. The concentration gradient of reduced cathodic and oxidized anodic species at their respective electrodes drives diffusion away from the electrode surfaces into the cell. When the oxidized anodic and reduced cathodic species diffuse into electron transfer range of each other they may exchange an electron and revert to their original oxidation states. This process causes continuous clearing of the freely diffusing cell requiring a minimum current flow to maintain the darkness of the cell. The advantage of this design is that the cell will always fail to the clear state upon the loss of electrical control. Therefore, to clear the cell it is only necessary to remove the driving electrical potential. It may be advantageous to clear the cell faster than the open circuit approach.

One method to accelerating the clearing of the cell is to short the anode to the cathode. The redox potential of the anodic and cathodic chemical species at the two electrodes is sufficient to drive electron transfer across the electrodes to revert the oxidized anodic and reduced cathodic EC species to their original oxidation states. This process allows reversion of the EC species at the electrode surfaces as well as near the center of the cell, approximately halving the diffusion distance required for clearing to occur. The reduced diffusion length reduces the clearing time of the cell.

Another possible route to decreasing clearing time is to reverse the bias on the electrodes for a short period of time as described in U.S. Pat. No. 7,990,603. By reversing the potential bias, anodic species are oxidized at what was the cathode and cathodic species are reduced at what was the anode. The reverse bias pulse is powered long enough to build a sufficient concentration of the opposite darkened EC species at the electrode surfaces to further reduce the diffusion distance required for clearing and thereby increase the clearing speed upon shorting of the cell.

A complication of the reverse biased clearing approach is that the diffusion rate of the EC species, like other chemical species, changes with temperature. An optimized reverse bias pulse at room temperature may be too short at low temperature or too long at high temperature. EC devices mounted proximate to exteriors of structures or vehicles may be exposed to high or low air temperatures as well as direct solar load. A darkened EC device can heat rapidly when directly exposed to sunlight. For this reason, it is preferable to be able to determine the temperature of the EC cell to optimize the control of the EC device.

SUMMARY

According to one embodiment of the present disclosure, a controller system configured to clear an electro-optic device may include an electro-optic device having a first substrate having a first surface and a second surface, the second surface having a first layer of electrically conductive material disposed thereon; a second substrate having a first surface having a second layer of electrically conductive material disposed thereon, and a second surface, the second substrate being approximately parallel to the first substrate such that a chamber is defined by the first and second substrates; and an electro-optic medium disposed in the chamber defined by the first and second substrates and in contact with the first layer of electrically conductive material and the second layer of electrically conductive material; a controller in communication with the electro-optic device, and a potentiometer in communication with the electro-optic device and with the controller. The controller may be configured to control electrical power supplied to the electro-optic device. The controller may be capable of supplying electrical power to the electro-optic device in one or more cycles, each cycle comprising supplying a reverse potential to the electro-optic device for a first measured time interval and supplying no power to the electro-optic device for a second measured time interval.

The controller may include a processor having instructions for determining a temperature of the electrochromic device. The controller may include a plurality of software routines executable by the controller; wherein each of the plurality of software routines includes instructions for providing one or more pulse width modulation signals to the electro-optic device; wherein each pulse width modulation signal comprises providing a reverse potential to the electro-optic device for a first measured time interval followed by a second measured time interval during which no power is supplied to the electro-optic device. The controller may be configured to execute one of the software routines configured to supply power to the electro-optic device based on a temperature of the electro-optic device.

According to another embodiment of the present disclosure, a controller system may be configured to clear an electro-optic device. The controller system may include an electro-optic device having a first substrate having a first surface, and a second surface having a first layer of electrically conductive material disposed thereon; a second substrate having a first surface having a second layer of electrically conductive material disposed thereon, and a second surface, the second substrate being approximately parallel to the first substrate such that a chamber is defined by the first and second substrates; and an electro-optic medium disposed in the chamber defined by the first and second substrates and in contact with the first and second layers of electrically conductive material; a controller in communication with the electro-optic device, wherein the controller is configured to control electrical power supplied to the electro-optic device such that electrical power is supplied in pulse width modulation signals, each pulse width modulation signal comprising a reverse potential applied to the electro-optic device for a first measured time interval and no power supplied to the electro-optic device for a second measured time interval; and a potentiometer in electrical communication with the electro-optic device and in communication with the controller.

The controller may include a plurality of software routines; wherein each of the plurality of software routines comprises instructions detailing the length of the first measured time interval and the second measured time interval, or the duty cycle and frequency of the pulse width modulation signal. The controller may execute one of the plurality of software routines configured to supply power to the electro-optic device based upon temperature of the electro-optic device. The controller may include instructions for determining a temperature range of the electrochromic device, the instructions comprising: applying a reverse bias to the electrochromic fluid for a first measured time period; stopping the application of the reverse bias to the electrochromic fluid for a second measured time period; measuring a first open cell potential of the electrochromic fluid at the beginning of the second measured time period; measuring a second open cell potential of the electrochromic fluid at the end of the second measured time period; and comparing the first open cell potential of the electrochromic fluid with the second open cell potential of the electrochromic fluid. The controller may include the additional step of using the difference between the first open cell potential and the second open cell potential to determine a diffusion gradient of the electrochromic fluid, and using the diffusion gradient to determine the temperature of the electrochromic fluid. The controller may further be configured to control the electro-optic device transitions from a substantially dark state to a substantially clear state without substantially reverse coloring. The controller may comprise at least one instruction set for clearing the electrochromic device, wherein each of the at least one instruction sets comprises the steps of applying a series of pulse width modulation signal s, each pulse width modulation signal comprising applying a reverse bias to the electrochromic fluid for a first measured time interval and applying no power to the electrochromic fluid for a second measured time period; and wherein the controller selects one instruction set based on the temperature range.

According to another embodiment of the present disclosure, a method of determining the temperature of an electro-optic device may include the following steps: providing a darkened or partially darkened electrochromic surface having a potentiometer disposed to measure a potential of an electrochromic fluid and a controller to apply a voltage to the electrochromic fluid; applying a measured voltage to the electrochromic fluid for a first measured time period; applying no voltage to the electrochromic fluid for a second measured time period; measuring the potential of the electrochromic fluid at the beginning of the second measured time period; measuring the potential of the electrochromic fluid at the end of the second measured time period; comparing the measurement of the potential of the electrochromic fluid at the end of the first measured time period with the measurement of the potential of the electrochromic fluid at the end of the second measured time period; determining whether the measurements provided sufficient information to calculate a diffusion gradient for the device; and calculating a diffusion gradient and determining the temperature for the device.

According to another embodiment of the present disclosure, a method of clearing a darkened or partially darkened electro-optic device may include the steps of: providing a darkened or partially darkened electrochromic surface having a potentiometer disposed to measure a potential of an electrochromic fluid and a controller to apply a voltage to the electrochromic fluid; and applying a series of pulses to the electrochromic fluid, each pulse comprising providing a reverse potential to the electrochromic fluid for a first measured time interval, and applying no voltage to the electrochromic fluid for a second measured time interval.

The method may further include the steps of providing a plurality of software routines executable by the controller, each of which may include instructions for providing a series of pulses of reverse potential to the electro-optic device, the instructions comprising the length of the first measured time interval and the second measured time interval. The controller may include instructions for determining a temperature range of the electrochromic device, the instructions comprising the steps of: applying a reverse bias to the electrochromic fluid for a first measured time interval; stopping the application of the reverse bias to the electrochromic fluid for a second measured time interval; measuring a first open cell potential of the electrochromic fluid at the beginning of the second measured time interval; measuring a second open cell potential at the end of the second measured time interval; and comparing the first open cell potential and the second open cell potential. The method may further include the steps of using the difference between the first open cell potential and the second open cell potential to calculate a diffusion gradient; and using the diffusion gradient to determine the temperature.

According to another embodiment of the present disclosure, a controller system may be configured to hold a particular transmittance level in an electro-optic device. The controller system may include an electro-optic device comprising a first substrate having a first surface and a second surface, the second surface having a first layer of electrically conductive material disposed thereon; a second substrate having a first surface having a second layer of electrically conductive material disposed thereon, and a second surface, the second substrate being approximately parallel to the first substrate such that a chamber is defined by the first and second substrates; and an electro-optic medium disposed in the chamber defined by the first and second substrates and in contact with the first layer of electrically conductive material and the second layer of electrically conductive material; a potentiometer in communication with the electro-optic device; and a controller in communication with the electro-optic device and with the potentiometer, wherein the controller may be configured to cause electrical power to be supplied to the electro-optic device through pulse width modulation. The potentiometer may monitor open cell potential decay of the electro-optic device between pulses provided through pulse width modulation. The controller may use the open cell potential decay to determine a temperature of the electro-optic device. The controller may choose a duty cycle and a frequency for the pulse width modulation based on the temperature.

According to another embodiment of the present disclosure, a non-transitory computer readable medium may have stored thereon software instructions that, when executed by a controller, cause the controller to generate control signals to control an electro-optic device, by executing the steps where the steps may include: applying a series of pulses to the electrochromic fluid, each pulse comprising providing a reverse potential to the electrochromic fluid for a first measured time period, and applying no voltage to the electrochromic fluid for a second measured time period.

According to yet another embodiment of the present disclosure, a controller system for an electro-optic device may comprise an electro-optic device comprising a first substrate having a first surface, and a second surface having a first layer of electrically conductive material disposed thereon; a second substrate having a first surface having a second layer of electrically conductive material disposed thereon, and a second surface, the second substrate being approximately parallel to the first substrate; a sealing member extending between first and second substrates such that a chamber is defined by the first and second substrates and the sealing member; and an electro-optic medium disposed in the chamber defined by the first and second substrates and the sealing member, and in contact with the first and second layers of electrically conductive material; a controller in communication with the electro-optic device, wherein the controller is configured to control electrical power supplied to the electro-optic device such that an electrical potential is applied and a current is measured to determine the temperature of the electro-optic device. The electrical potential and a current draw of the electro-optic device may be used to determine the optical absorbance of the electro-optic device. The electrical power supplied to the electro-optic device may be adjusted based on at least one of the temperature and the optical absorbance. The controller system may further comprise a memory; at least one adjustment factor may be stored in the memory; and each of the at least one adjustment factors may be associated with one of a temperature and a temperature range. The controller may be configured to select an adjustment factor based on the temperature of the electro-optic device. The controller may be configured to apply the selected adjustment factor to the voltage being applied to the electro-optic device; and the application of the adjustment factor may vary the applied voltage. The controller may be configured to adjust the electrical power applied to the electro-optic device to maintain a desired level of transmissivity in the electro-optic device.

These and other features, advantages, and objects of the present disclosure will be further understood and appreciated by those skilled in the art by reference to the following specification, claims, and appended drawings.

DETAILED DESCRIPTION

Figure 1:
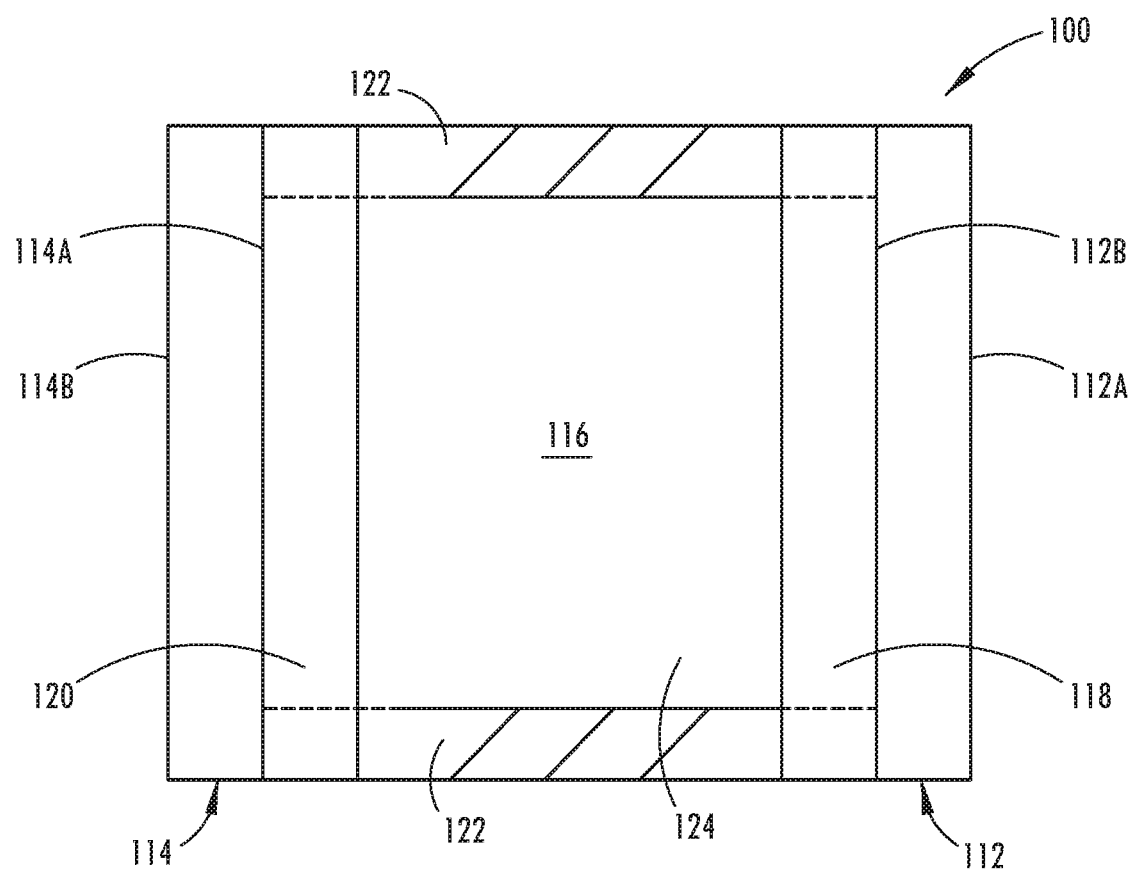
FIG. 1 is a cross-sectional schematic representation of an electro-optic device in accordance with the present disclosure.

Referring to the drawings and to FIG. 1 in particular, a cross-sectional schematic representation of electro-optic device 100 is shown, which generally comprises first substrate 112 having front surface 112A and rear surface 112B, second substrate 114 having front surface 114A and rear surface 114B, and chamber 116 for containing electro-optic medium 124. It will be understood that electro-optic device 100 may comprise, for illustrative purposes only, a mirror, a window, a display device, a contrast enhancement filter, and the like. It will be further understood that FIG. 1 is merely a schematic representation of electro-optic device 100. As such, some of the components have been distorted from their actual scale for pictorial clarity.

One or more layers of electrically conductive material 118 may be associated with rear surface 112B of first substrate 112. These layers serve as an electrode for electro-optic device 100. One or more layers of electrically conductive material 120 may be associated with front surface 114A of second substrate 114, and may be operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

For purposes of the present disclosure, electro-optic medium 124 comprises at least one anodic material, at least one cathodic material, and at least one solvent. Typically, both the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Furthermore, it will be understood that the term "electrochromic" will be defined herein, regardless of its ordinary meaning, as a material that exhibits a change in its extinction coefficient at one or more wavelengths upon exposure to a particular electrical potential difference.

Figure 2:
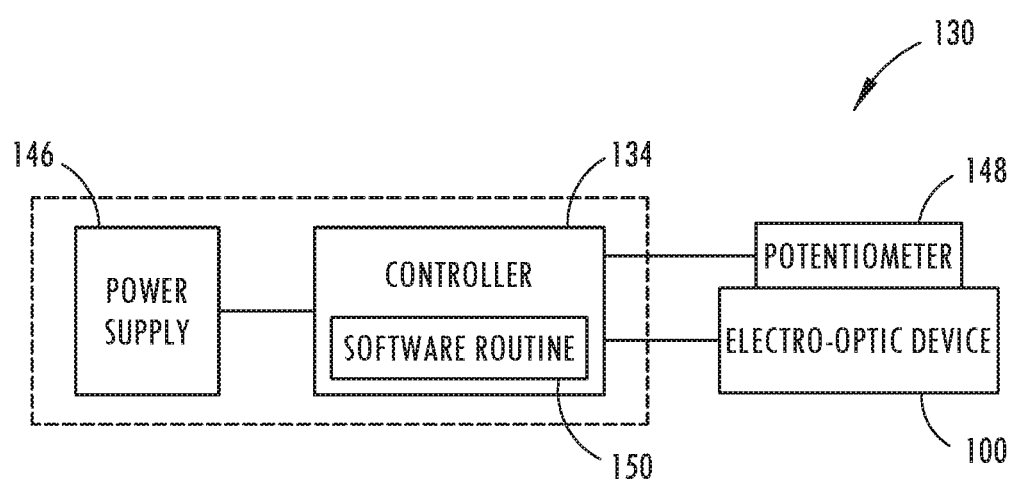
FIG. 2 is a schematic diagram of the electro-optic device and controller of the present disclosure.

In reference to FIG. 2, a controller system for electro-optic device 100 is generally shown at 130. Controller system 130 may include a controller 134 in communication with electro-optic device 100. Controller 134 may be a programmable controller. A power supply 146 may be in communication with controller 134. According to some embodiments, controller 134 may have one or more pre-loaded executable software routines or algorithms 150 stored thereon, each of which may include instructions for providing a series of pulses of reverse potential to electro-optic device 100, which software routines 150 can be executed by controller 134.

According to some embodiments, controller 134 may be in communication with a potentiometer 138. Potentiometer 138 may also be in communication with at least one electrode or at least one layer of electrically conductive material 118, 120 of electro-optic device 100. Potentiometer 138 may be disposed at an edge of electro-optic device 100 in proximity to sealing member 122 and in a position in which it can monitor the voltage or open cell potential of electro-optic device 100.

According to some embodiments, controller 134 may selectively provide power to electro-optic device 100. Providing power to electro-optic device 100 may cause the electro-optic device to darken, while providing no power or providing a reverse potential may cause electro-optic device 100 to clear. It should be appreciated by those skilled in the art that a plurality of controllers 134 and/or a plurality of electro-optic devices 100 can be included in controller system 130.

The clearing of a darkened or partially darkened electro-optic device 100 is a matter of having the color species return to their uncolored form, such that the electrons are transferred to and from colored species to yield their lower energy, uncolored counterparts. This can occur by diffusion alone. However, diffusion is typically slow in larger electro-optic devices, becoming slower with increasing device size.

Electro-optic device 100 may be symmetrical, in that it can color with either electrode acting as the anode or cathode. By applying a reverse potential to electro-optic device 100 (i.e., opposite of the polarity used to color it), species are formed at the electrodes that annihilate the existing colored species (e.g., actual meeting of colored species and consequent electron transfer). This increases the speed of clearing; however, a critical point for annihilation can be passed, wherein electro-optic device 100 starts coloring again in response to the reverse potential. This may be referred to as "reverse coloring" and may be considered undesirable.

Upon exposure to sunlight, electro-optic devices 100 may absorb some of the incident solar radiation and convert it to heat. The amount of the solar radiation absorbed may vary according to the transmissive state of electro-optic device 100 and the amount of solar radiation impinging on electro-optic device 100. Thus, electro-optic devices in close proximity to one another may experience temperatures that differ from one another.

In some cases, the temperatures of an electro-optic device 100 may reach or exceed 100 degrees C. At increased temperatures, the transmissivity of electro-optic devices may increase, and the speed of the change in transmissivity may increase with increasing temperatures. Thus, temperature variations between electro-optic devices may result in differing degrees of transmissivity through different electro-optic devices 100. For example, a first electro-optic device operating at higher temperatures than a second electro-optic device may experience higher transmissivity than the second electro-optic device. The increased transmissivity may result in electro-optic devices 100 not reaching the desired levels of darkness, or in different electro-optic devices in proximity to one another but exposed to differing levels of sunlight having different levels of darkening. Therefore, determining the temperature and adjusting the potential applied to an electro-optic device may enable better control of transmissivity levels.

For a given potential applied to an electro-optic device 100, the current draw of the electro-optic device 100 may be related to the device temperature. In some embodiments, controller 134 may be configured to monitor the current draw of electro-optic device 100, and use that information to derive the temperature at which electro-optic device 100 is operating.

Once controller 134 has determined the temperature of electro-optic device 100, controller may determine an adjustment factor. The adjustment factor may be used to adjust the potential being applied to electro-optic device 100. The application of the adjustment factor to the potential to be applied to electro-optic device 100 may overcome any undesirable effect of elevated temperatures on transmissivity levels.

In some embodiments, controller 134 may periodically measure current draw of electro-optic device 100, determine the operating temperature of electro-optic device, and adjust the applied voltage accordingly to achieve the desired degree of transmissivity of electro-optic device 100. In some embodiments, once electro-optic device 100 has reached the desired level of transmissivity, controller 134 may periodically measure current draw, determine an operating temperature, and adjust the applied voltage if necessary to maintain the desired level of transmissivity.

In some embodiments, controller 134 may have stored a plurality of adjustment factors in a memory (not shown). Each adjustment factor may be associated with a temperature or temperature range. Once controller 134 has determined the temperature of electro-optic device 100, controller 134 may choose the associated adjustment factor from the plurality of stored adjustment factors. Controller 134 may then apply the chosen adjustment factor to the voltage being applied to electro-optic device 100 to compensate for variations in operating temperatures. The application of the adjustment factor may vary the applied voltage, either increasing it or decreasing it, to change the transmissivity of electro-optic device 100. At some temperatures, an adjustment factor will not need to be applied.

In some embodiments, pulse width modulation (PWM) may be used to correct for ambient temperatures. By applying a PWM signal to electro-optic medium 124, or by applying a reverse potential to electro-optic medium 124 for a first measured time interval and following the first measured time interval with a second measured time interval during which no current flows through electro-optic medium 124, controller system 130 can produce a faster clearing process with no or minimal reverse coloring of device 100. A duty cycle may be defined as the time of the first measured time interval as a percentage of the combined total time of the first and second measured time intervals; i.e., the percentage of time during which power is applied to electro-optic device 100. Frequency may be defined as the number of duty cycles per unit time.

Applying PWM to device 100 allows periods of open circuit between the driving pulses. During open circuit conditions, the open cell potential of electro-optic device 100 can be measured. The open cell potential gives a measure of the state of the electrochemical species at the electrode interfaces. Measuring the open cell potential at the beginning and at the end of an open circuit period may indicate the decay rate of the open cell potential and allow calculation of a diffusion rate of the colored species. The decay rate of the open cell potential indicates the strength of the chemical gradient out from the electrode interfaces. The decay rate and the open cell potential give a measure of how close to "steady state" (i.e., neither clearing nor darkening) device 100 is.

In some embodiments, the diffusion rate of the colored species is affected by temperature, and the temperature of electro-optic device 100 and its colored species may vary greatly depending on ambient conditions. Therefore, it may be desirable to select the lengths of the first and second time intervals, or duty cycle and frequency, based on the temperature of the colored species in order to accurately achieve an optimal clearing speed without reverse coloring. Thus, determining a temperature of electro-optic device 100 may be advantageous. However, the temperature of electro-optic device 100 and the associated colored species is difficult to measure accurately without a sensor disposed in electro-optic material 118, 120, which may be undesirable for aesthetic reasons.

Figure 3:
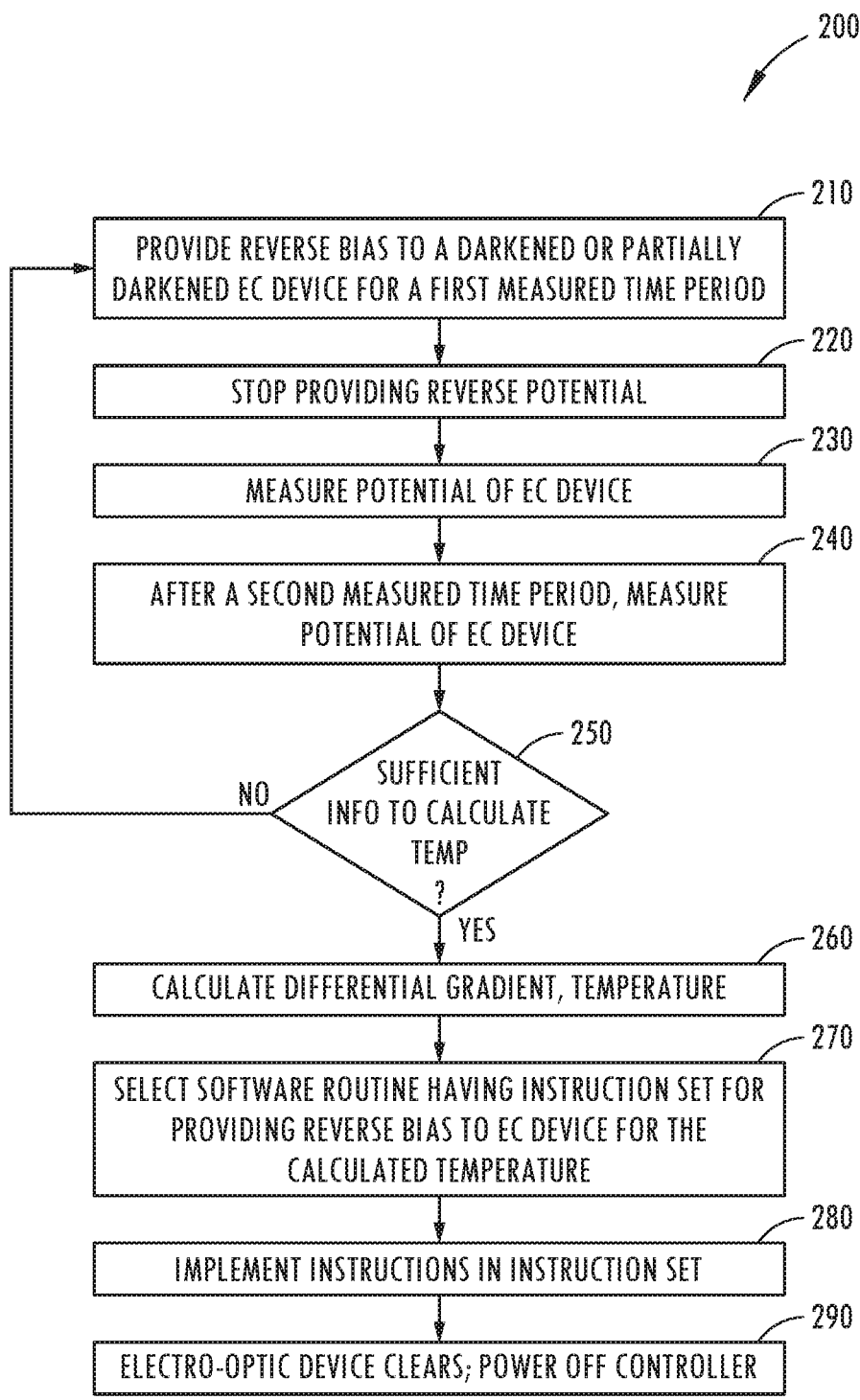
FIG. 3 is a flow chart of an embodiment of a method of optimally clearing the electro-optic device of FIG. 2.

A method for determining the temperature of the colored species and rapidly clearing device 100 without reverse coloring is generally shown in FIG. 3 at 200. Electro-optic device may be in one of a darkened or partially darkened state as an initial state. The method 200 starts at step 210 with the beginning of a duty cycle, in which a reverse potential may be supplied to an electro-optic device for a first measured time period. At step 220, the duty cycle continues as the electrical power is stopped for a second measured time period and, in step 230, potentiometer 138 measures the voltage potential across electro-optic medium 124. The voltage potential may be measured at the beginning of the second measured time period immediately after the cessation of the application of the voltage potential across electro-optic medium 124. Diffusion of the colored species may take place during the second measured time period during which no power is supplied to electro-optic device. At step 240, at the end of the second measured time period and the end of a duty cycle, potentiometer 138 again measures the voltage potential across electro-optic medium 124.

It may be possible to determine a temperature of the colored species based on the measured potentials at the beginning and end of the second measured time period. Controller 134 may compare the potential measured at the beginning of the second measured time period with the potential measured at the end of the second measured time period and determine the difference. Since the rate of decay of potential when power is not being supplied is a function of temperature, the difference in potentials may provide sufficient information to allow the determination of a diffusion gradient which, in turn, may allow the determination of the temperature of device 100. In some cases, one set of measured potentials from the beginning and end of a second measured time period may provide sufficient information for controller 134 to determine a diffusion gradient and use the diffusion gradient to determine a temperature or temperature range. However, in some instances, a single set of measurements from a second measured time period may not provide sufficient information to determine the diffusion gradient and/or determine the temperature or temperature range. In the latter situation, additional measurements of potentials at subsequent second measured time periods may be needed. As shown in step 250, in some embodiments, after taking a set of measurements at the beginning and end of a second measured time period controller 134 may determine whether it has sufficient information to calculate the diffusion gradient and to determine the temperature of electro-optic device 100. If controller 134 does not have sufficient information to calculate a temperature, steps 210-250 may be repeated. If there is sufficient information to calculate the temperature, controller 134 may calculate the differential gradient and determine the temperature as shown in step 260.

Figure 4:
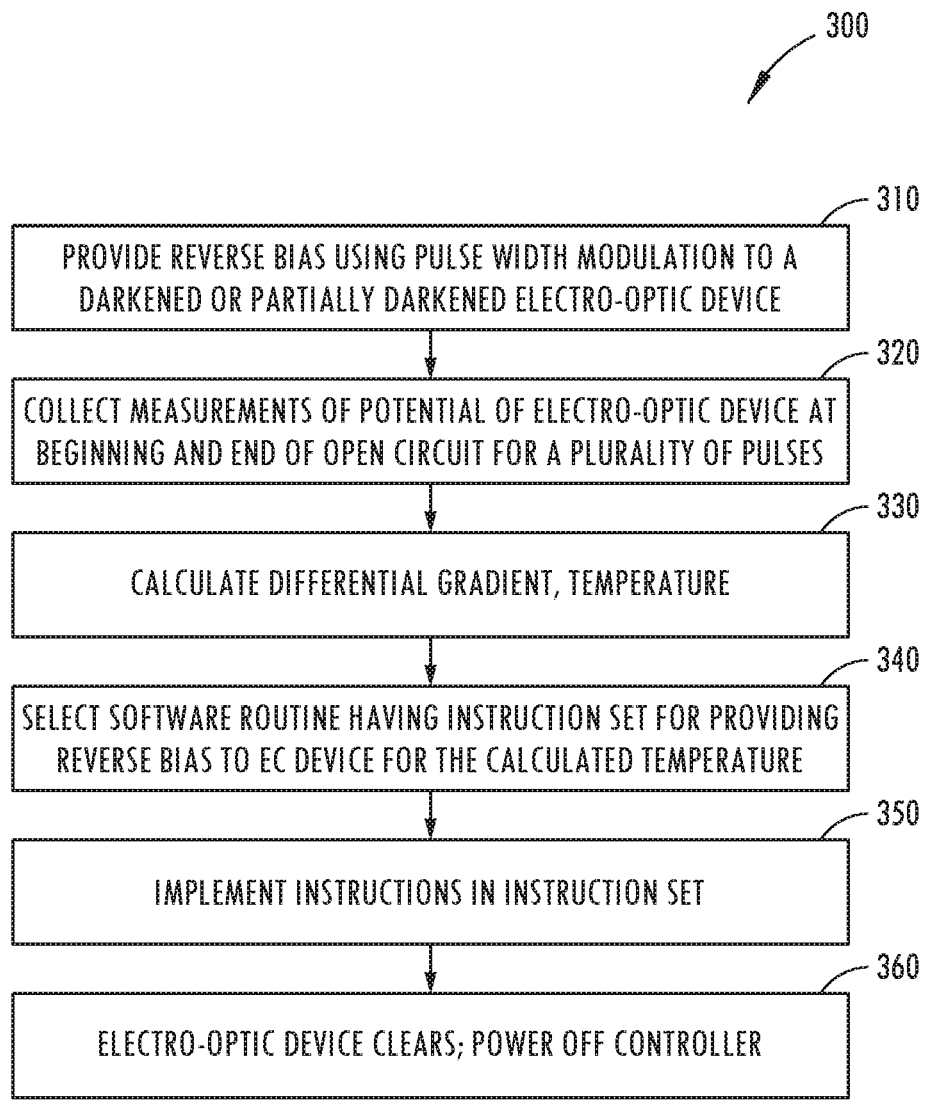
FIG. 4 is a flow chart of a second embodiment of a method of optimally clearing the electro-optic device of FIG. 2.

Alternatively, in some embodiments as shown in FIG. 4, a set number of duty cycles may be applied to electro-optic medium 124. In the method illustrated in FIG. 4, a reverse bias is provided to a darkened or partially darkened electro-optic device in step 310. The potential may be measured at the beginning and end of the second measured time period of each duty cycle as shown in step 320. Controller 134 may calculate a potential difference for each duty cycle, and use those to calculate a diffusion gradient and to determine the temperature of electro-optic device 100 as shown in step 330.

After determining the temperature, controller 134 may then select one of the pre-loaded executable software routines 150 as shown in step 270 and 340. Software routine 150 will be chosen based on the calculated temperature, and the implementation of the selected software routine may result in optimal clearing speed of electro-optic device 100 at its current temperature with minimal or no reverse coloring.

Software routines 150, when executed by controller 134, may direct controller 134 to provide power or a reverse potential to electro-optic device 100. Power or reverse potential may be provided continuously or in pulses such as through PWM signals. Each PWM cycle may comprise providing a reverse potential to device 100 for a first measured time interval followed by a second measured time interval during which no power is supplied to device 100, and each software routine 150 may comprise a frequency and duty cycle for a PWM signal. Choosing a software routine 150 with an appropriate frequency and duty cycle for device 100 temperature may optimize clearing speed while avoiding reverse coloring of device 100.

To clear device 100, the pulse width modulation signal may be applied for a set number of cycles or until a certain event has taken place; for example, when electro-optic device 100 has reached the desired level of clearing or when electro-optic device 100 has cleared.

The duty cycles in software routines 150 may range from 0% to 100%. The plurality of software routines 150 may all have the same duty cycles but differ in frequency, or may all have the same frequency, but have different duty cycles, or have both different duty cycles and different frequencies from one another.

The duty cycles and frequencies in the plurality of software routines 150 which are used to clear device 100 in step 280 may be the same as or different than the duty cycle and frequency used when determining the temperature of electro-optic device 100 in steps 220-260.

In step 280 and 350, the instructions in software routine 150 are executed, and electro-optic device is cleared. Finally, the method 200 can end at step 290 or 360 when electro-optic device 100 is in a clear state and controller system 130 has been powered off.

Pulse width modulation may also be beneficial for driving larger electrochromic or electro-optic cells, like electrochromic windows, to intermediate states. Currently, controllers drive electro-chromic windows to intermediate states through voltage control. In this approach, the steady state transmissance changes rapidly from about 0.3V to about 0.5V. This makes it difficult to reliably hold a transmittance level in that range. Also, because the transmittance level is so sensitive in that range, it is significantly affected by temperature change. Furthermore, there is significant voltage drop (IR effects) across electrically conductive material 118, 120 due to its sheet resistance. Thus, at lower drive potentials there is significant irising between the center and edge of larger parts. Pulse width modulation may address all of these issues. Because the part may be pulsed at the maximum (1.2V) drive potential, the effects of IR drop across electrically conductive material 118, 120 are minimized. Because the charging rate of the electro-optic cell is controlled by the duty cycle of the PWM, intermediate transmittance states can be controlled, even in the steepest part of the transition. Lastly, monitoring of the open cell potential decay between pulses allows the diffusion rate of the cell (temperature) to be determined and corrected for in order to hold a particular transmittance level.

Figure 5:
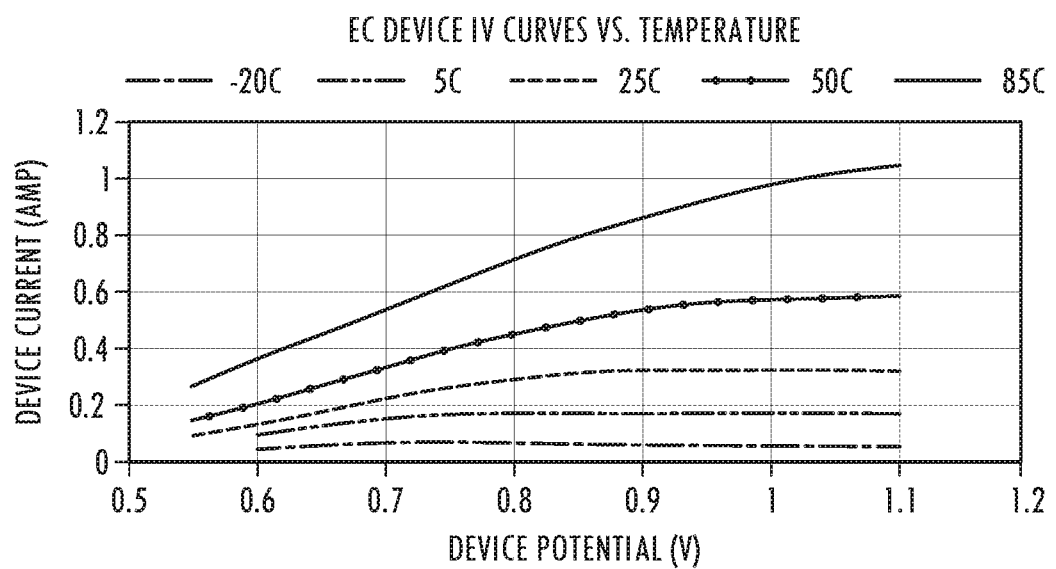
FIG. 5 is a graph of current vs potential in an electro-optic device at different temperatures.

While the temperature of EO device 100 can be directly measured via routes such as a thermocouple or optical pyrometer, in some cases, design constraints may make these approaches undesirable. One alternative approach to determining the temperature of EO device 100 is to determine the steady state current at multiple potentials and temperatures as shown in the example in FIG. 5.

The data collected from such an experiment may be evaluated statistically as a response surface. Potential and current are considered factors and temperature is considered a response. Regression analysis may be used to generate a mathematical formula describing an empirical relationship between applied potential, measured current and the temperature of EO device 100. For the data shown in FIG. 5, this relationship is described by the following formula:

$$\text{Temperature} = 238.1 - 642.9\,V + 413.6\,I + 370.5\,V^2 - 82.0\,I^2 - 213.8\,IV \quad (R^2 = 96.31\%) \qquad \text{Formula 1}$$

Once the temperature of EO device 100 is known, reverse bias pulse times optimized for specific device temperature can be utilized to further enhance EO device performance. These times may be represented by, for example, a formula relating the optimum reverse bias time to temperature or a lookup table enabling interpolation based on the nearest listed values.

Figure 6:
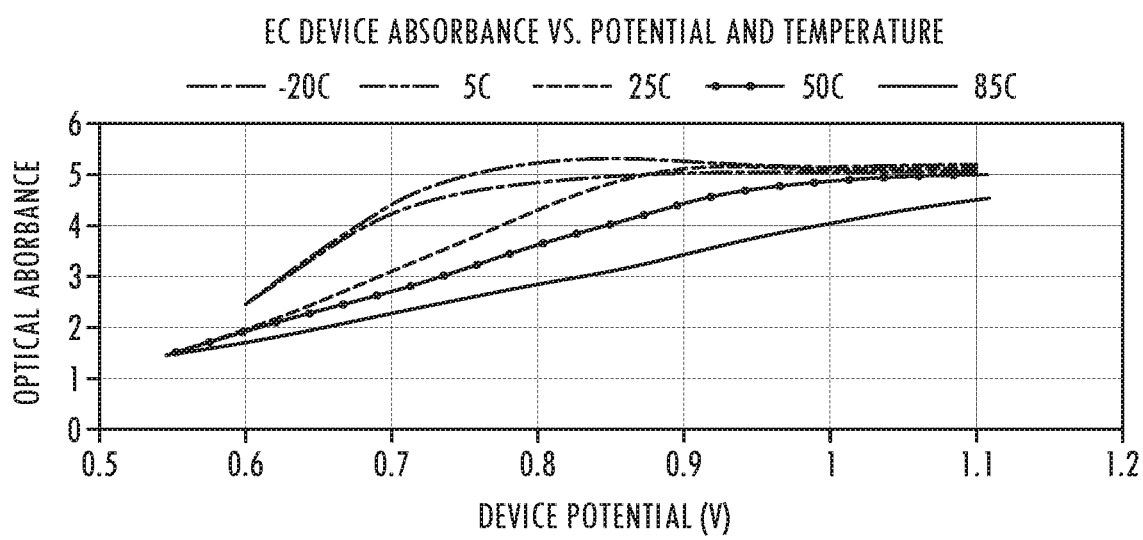
FIG. 6 is a graph of optical absorbance as a function of potential of an electro-optic device at different temperatures.

In a similar manner, the steady state optical absorbance of EO device 100 can be measured at multiple device potentials and temperatures as shown in the example of FIG. 6. A response surface generated from the data shown in FIG. 6 gives the following relationship:

$$\text{Absorbance} = -12.870 + 38.25\ V - 9.25\ I - 19.95\ V2 - 1.472\ I2 + 9.34\ IV\ (R2 = 96.59\%) \qquad \text{Formula 2}$$

Thus, it is possible to calculate the steady state absorbance of the EO device 100 based on the potential and current draw at steady state. At a fixed potential, the steady state absorbance can be a function of EO device temperature. This relationship also enables the calculation of temperature corrected potentials for driving EO device 100 to specific intermediate states.

As discussed above, once controller 134 has determined the temperature of electro-optic device 100, controller may determine an adjustment factor. The adjustment factor may be used to adjust the potential being applied to electro-optic device 100. The application of the adjustment factor to the potential to be applied to electro-optic device 100 may overcome any undesirable effect of elevated temperatures on transmissivity levels.

According to some embodiments, electro-optic device 100 is an electrochromic window. However, it should be appreciated by one having ordinary skill in the art that electro-optic device 100 may be any suitable electro-optic device, including, but not limited to, an electrochromic mirror. References to electro-optic device 100 being an electrochromic device are for purposes of explanation and not limitation.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

The invention claimed is:

1. A controller system configured to clear an electro-optic device, the controller system comprising:
    an electro-optic device comprising:
        a first substrate having a first surface, and a second surface having a first layer of electrically conductive material disposed thereon;
        a second substrate having a first surface having a second layer of electrically conductive material disposed thereon, and a second surface, the second substrate being approximately parallel to the first substrate;
        a sealing member extending between first and second substrates such that a chamber is defined by the first and second substrates and the sealing member; and
        an electro-optic medium disposed in the chamber defined by the first and second substrates and the sealing member, and in contact with the first and second layers of electrically conductive material;
    a controller in communication with the electro-optic device; and
    a potentiometer in electrical communication with the electro-optic device and in communication with the controller;
    wherein the controller is capable of controlling electrical power supplied to the electro-optic device in one or more cycles, each cycle comprising supplying a reverse potential to the electro-optic device for a first measured time interval and supplying no power to the electro-optic device for a second measured time interval.

2. The controller system of claim 1, wherein the controller is a programmable controller.

3. The controller system of claim 1, wherein the controller is operable to execute one or more software routines; wherein each of the one or more software routines comprises instructions detailing the length of the first measured time interval and the second measured time interval.

4. The controller system of claim 3, wherein the controller executes one of the one or more software routines configured to supply power to the electro-optic device based on a temperature of the electro-optic device.

5. The controller system of claim 1, wherein the controller is operable to execute instructions for determining a temperature range of the electrochromic device, the instructions comprising: measuring a first open cell potential of the electrochromic fluid at the beginning of the second measured time interval; measuring a second open cell potential of the electrochromic fluid at the end of the second measured time interval; and comparing the first open cell potential of the electrochromic fluid with the second open cell potential of the electrochromic fluid.

6. The controller system of claim 5, wherein the instructions comprise the additional step of using the difference between the first open cell potential and the second open cell potential to determine a diffusion gradient of the electrochromic fluid, and using the diffusion gradient to determine the temperature of the electrochromic fluid.

7. The controller system of claim 1, wherein the controller is further configured to control the electro-optic device transitions from a substantially dark state to a substantially clear state without substantial reverse coloring.

8. The controller system of claim 1, wherein the controller comprises at least one instruction set for clearing the electrochromic device, wherein the at least one instruction set comprises the steps of applying one or more pulse width modulation signals, each pulse width modulation signal comprising applying a reverse bias to the electrochromic fluid for a first measured time interval and applying no power to the electrochromic fluid for a second measured time period, and each pulse width modulation signal comprising a duty cycle and a frequency; and wherein controller selects one instruction set based on the temperature range.

9. A controller system configured to maintain a particular transmittance level in an electro-optic device, comprising:
    an electro-optic device comprising:
        a first substrate having a first surface and a second surface, the second surface having a first layer of electrically conductive material disposed thereon;
        a second substrate having a first surface having a second layer of electrically conductive material disposed thereon, and a second surface, the second substrate being approximately parallel to the first substrate;

a sealing member extending between first and second substrates such that a chamber is defined by the first and second substrates and the sealing member; and an electro-optic medium disposed in the chamber defined by the first and second substrates and the sealing member, and in contact with the first layer of electrically conductive material and the second layer of electrically conductive material;

a potentiometer in communication with the electro-optic device; and a controller in communication with the electro-optic device and with the potentiometer, wherein the controller is configured to use one or more pulse width modulation signals to cause electrical power to be supplied to the electro-optic device.

10. The controller system of claim 9, wherein the potentiometer monitors an open cell potential decay of the electro-optic device between pulses of electrical power provided through one or more pulse width modulation signals.

11. The controller system of claim 9, wherein the controller uses the open cell potential decay to determine a temperature of the electro-optic device; wherein the controller chooses a duty cycle and a frequency for the pulse width modulation based on the temperature.

12. A controller system for an electro-optic device comprising:

an electro-optic device comprising:
a first substrate having a first surface, and a second surface having a first layer of electrically conductive material disposed thereon;
a second substrate having a first surface having a second layer of electrically conductive material disposed thereon, and a second surface, the second substrate being approximately parallel to the first substrate;
a sealing member extending between first and second substrates such that a chamber is defined by the first and second substrates and the sealing member; and
an electro-optic medium disposed in the chamber defined by the first and second substrates and the sealing member, and in contact with the first and second layers of electrically conductive material;
a controller in communication with the electro-optic device, wherein the controller is configured to control electrical power supplied to the electro-optic device such that an electrical potential is applied and a current is measured to determine the temperature of the electro-optic device.

13. The controller system of claim 12, wherein the electrical potential and a current draw of the electro-optic device are used to determine the optical absorbance of the electro-optic device.

14. The controller system of claim 13, wherein the electrical power supplied to the electro-optic device is adjusted based on at least one of the temperature and the optical absorbance.

15. The controller system of claim 12, further comprising a memory;
wherein at least one adjustment factor is stored in the memory; and
wherein each of the at least one adjustment factors is associated with one of a temperature and a temperature range.

16. The controller system of claim 15, wherein controller is configured to select an adjustment factor based on the temperature of the electro-optic device.

17. The controller system of claim 16, wherein the controller is configured to apply the selected adjustment factor to the voltage being applied to the electro-optic device; and
wherein the application of the adjustment factor varies the applied voltage.

18. The controller system of claim 12, wherein the controller is configured to adjust the electrical power applied to the electro-optic device to maintain a desired level of transmissivity in the electro-optic device.

\* \* \* \* \*